H. F. DERNELL.
ICE-PICK.

No. 177,106. Patented May 9, 1876.

WITNESSES:
Chas. Nida
John Goetzals

INVENTOR:
H. F. Dernell
BY
ATTORNEYS.

UNITED STATES PATENT OFFICE.

HERMAN F. DERNELL, OF ATHENS, NEW YORK.

IMPROVEMENT IN ICE-PICKS.

Specification forming part of Letters Patent No. 177,106, dated May 9, 1876; application filed April 10, 1876.

*To all whom it may concern:*

Figure 1:
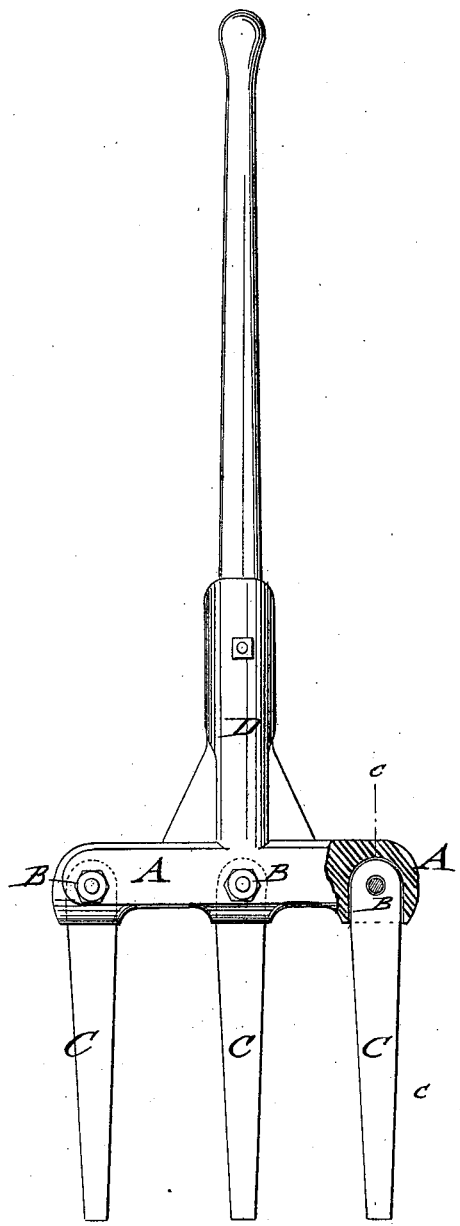
Figure 2:
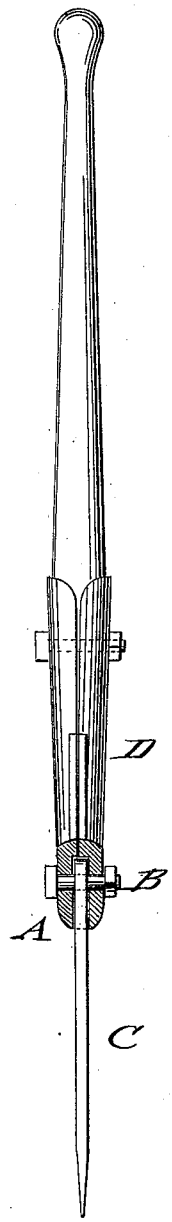

Be it known that I, HERMAN F. DERNELL, of Athens, in the county of Greene and State of New York, have invented a new and Improved Ice-Splitting Tool, of which the following is a specification:

In the accompanying drawing, Figure 1 represents a front view, and Fig. 2 a vertical transverse section on lines $c\ c$, Fig. 1, of my improved ice-splitting tool.

Similar letters of reference indicate corresponding parts.

The invention relates to an improved tool for splitting ice after the same has been grooved by the plow, and also for cutting blocks of ice; and it consists of a number of tines, or a cutting-blade, set into a sectional head, and attached by fastening screw-bolts, or in other manner.

In the drawing, A represents a sectional head of my improved tool or chisel for cutting ice. The head is made of two parts, that are clamped together by fastening bolts and nuts B to retain the tines C.

The tines C are made tapering at the points, but of equal thickness throughout the remaining part, to be readily introduced into the groove cut by the plow on the ice for splitting the same. The ends of the tines are set into corresponding recesses of the head A, and preferably made wider at the upper ends, to increase thereby their strengh. The tines may be readily detached from the head and others of greater length substituted, according to the thickness of the ice to be split.

The thickness of the tines has to be about, or somewhat less than, the width of the grooves cut on the ice, to admit the splitting of the ice by the chisel action of the tool reaching to the cornermost point of the groove.

By extending the recesses of the head a cutting-blade may be inserted into the head, and the tool then be used for separating the cakes when taken from the ice-house.

The head A is attached by a braced socket, D, and cross-bolt to the handle, forming a strong, durable, and solid instrument for splitting and cutting ice.

Having thus described my invention, what I claim as new, and desire to secure by Letters Patent, is—

An improved tool or chisel for splitting ice, made of a sectional head, that retains the detachable tines or cutting-blade by screw-bolts or other fastening devices, substantially in the manner and for the purpose specified.

HERMAN F. DERNELL.

Witnesses:
PAUL GOEPEL,
T. B. MOSHER.